US009903566B1

(12) United States Patent
Johnston

(10) Patent No.: US 9,903,566 B1
(45) Date of Patent: Feb. 27, 2018

(54) PORTABLE FLOOR LIGHT

(71) Applicant: Darryl R. Johnston, Payson, AZ (US)

(72) Inventor: Darryl R. Johnston, Payson, AZ (US)

( * ) Notice: Subject to any disclaimer, the term of this patent is extended or adjusted under 35 U.S.C. 154(b) by 0 days.

(21) Appl. No.: 15/587,476

(22) Filed: May 5, 2017

Related U.S. Application Data

(60) Provisional application No. 62/333,150, filed on May 6, 2016.

(51) Int. Cl.

| | |
|---|---|
| ***G01B 11/26*** | (2006.01) |
| ***F21V 15/01*** | (2006.01) |
| ***F21V 23/04*** | (2006.01) |
| ***F21V 23/02*** | (2006.01) |
| ***F21V 9/00*** | (2018.01) |
| ***F21V 7/04*** | (2006.01) |
| ***F21L 14/00*** | (2006.01) |
| ***F21V 23/00*** | (2015.01) |
| ***F21L 4/02*** | (2006.01) |

(52) U.S. Cl.
CPC ................ *F21V 15/01* (2013.01); *F21L 4/02* (2013.01); *F21L 14/00* (2013.01); *F21V 7/04* (2013.01); *F21V 9/00* (2013.01); *F21V 23/001* (2013.01); *F21V 23/02* (2013.01); *F21V 23/0414* (2013.01); *F21V 23/0464* (2013.01); *F21V 23/0471* (2013.01)

(58) Field of Classification Search
CPC .... F21V 15/01; F21V 23/0414; F21V 23/001; F21V 23/0464; F21V 23/02; F21V 23/0471; F21V 9/00; F21V 7/04; F21L 4/02; F21L 14/00; H01L 2924/0002; H01L 2924/00; H01L 25/0753; F21Y 2115/10
See application file for complete search history.

(56) References Cited

U.S. PATENT DOCUMENTS

| | | | | |
|---|---|---|---|---|
| 4,337,507 | A | 6/1982 | Lasker | |
| 4,544,993 | A | 10/1985 | Kirk | |
| 4,947,298 | A | 8/1990 | Stephen | |
| 5,194,314 | A | 3/1993 | Hooft | |
| 5,343,375 | A | 8/1994 | Gross et al. | |
| 5,763,872 | A | 6/1998 | Ness | |
| 6,896,388 | B2 | 5/2005 | George et al. | |
| 6,955,448 | B1 | 10/2005 | Lefferson | |
| 7,607,794 | B1 * | 10/2009 | Thompson | F21V 7/005 362/147 |
| 7,918,579 | B2 | 4/2011 | Hamar et al. | |
| 8,098,017 | B2 | 1/2012 | Chidester | |

(Continued)

*Primary Examiner* — Michael C Zarroli
(74) *Attorney, Agent, or Firm* — Invention To Patent Services; Alex Hobson

(57) ABSTRACT

A portable floor light emits light along a surface of the floor and at a shallow emitted angle to provide lighting during dark conditions. The housing of the portable floor light has a curved light emitting edge with a light emitting gap to project light across a wide area of the floor. The light emitting edge may be an arc that extends 60 degrees or more, such as 90 degrees or 180 degrees for example. The portable floor light has a motion sensor and ambient light sensor that provide input to a controller. The light will be activated when motion is detected and the ambient light is below a threshold value, or in darker conditions. The light emitted may have a wavelength no less than about 570 nm to avoid disrupting the circadian rhythms of people when they get up in the night, for example.

23 Claims, 7 Drawing Sheets

(56) References Cited

U.S. PATENT DOCUMENTS

| | | | | |
|---|---|---|---|---|
| 8,434,896 | B1 | 5/2013 | Embry | |
| 2005/0185417 | A1* | 8/2005 | Mayer | F21S 48/328 362/555 |
| 2008/0204258 | A1 | 8/2008 | Dayton et al. | |
| 2009/0034271 | A1* | 2/2009 | Gorres | F21V 7/04 362/346 |
| 2010/0202136 | A1* | 8/2010 | Vittozzi | B60Q 1/2615 362/183 |
| 2010/0231400 | A1 | 9/2010 | Von Mohr et al. | |
| 2014/0306612 | A1* | 10/2014 | Woodgate | F21V 23/0471 315/153 |
| 2014/0375434 | A1* | 12/2014 | Puljan | F21V 33/004 340/12.5 |
| 2016/0006914 | A1* | 1/2016 | Neumann | G06F 3/0325 348/78 |
| 2017/0350574 | A1* | 12/2017 | Di Trapani | G02B 6/0046 |

* cited by examiner

PORTABLE FLOOR LIGHT

CROSS REFERENCE TO RELATED APPLICATIONS

This application claims the benefit of priority to U.S. provisional patent application 62/333,150 filed on May 6, 2016; the entirety of which is hereby incorporated by reference herein.

BACKGROUND OF THE INVENTION

Field of the Invention

The invention is directed to a floor light and particularly to a floor light that emits light along the surface of the floor and at a wavelength that will not disturb a person's melatonin production.

Background

Many people get up during the night to go to the bathroom, get a drink or a snack and many do so with the lights off, as they do not want to wake others in the bedroom and/or the bright room lights are uncomfortable. About 10,000 Baby Boomers turn 65 every day in the United States. In addition, a recent study by the U.S. Preventative Services Task Force found that falls are a leading cause of death, disability and loss of independence for people 65 years and older. Therefore, seniors that get up during the night without turning on the lights run an increased risk of tripping and falling. In addition, traditional lighting can produce wavelengths of light that are detrimental to sleep. Fluorescent bulbs and light-emitting diodes (LEDs) are very common room lights sources as they are more energy efficient and typically provide better lighting than incandescent bulbs. People have biological clocks that work in rhythms, circadian rhythm, set by the amount of light and dark the body is exposed to. Circadian rhythms control the timing of many physiological processes including and in particular control sleeping patterns. When people get up in the night time and turn on room lights, their sleeping pattern may be disrupted, making it very difficult to get back to sleep. It is recommended that people avoid artificial light, especially violet, blue, green and yellow light before going to bed. Unfortunately, this wavelength of light is produced by standard lights and by television screens and computer monitors. Orange and red light, or light having a wavelength of more than about 590 nm does not disturb circadian rhythms the way light of lower wavelength light does.

SUMMARY OF THE INVENTION

The invention is directed to a portable floor light that emits light along the surface of the floor. The light is emitted at a shallow angle, or emitted angle, to prevent direct light from hitting the person's eyes, to avoid disrupting their circadian rhythm. In addition, in an exemplary embodiment, the light emitted from the portable floor light is a high wavelength light, wherein the emitted light has a wavelength of more than about 590 nm. An example portable floor light has a curved light emitting edge comprising an emitting gap or slot that extends along the light emitting edge to project the light out uniformly across a large area of flooring. The portable floor light may be semi-circular in shape, such as a quarter circle or half circle shape. An exemplary portable floor light comprises a motion detector and an ambient light sensor, wherein the light is activated when motion is detected and the ambient light sensor does not detect light above an ambient light threshold value. The light will only be activated when motion is detected and when the ambient light is low, below an ambient light threshold.

An exemplary portable floor light comprises a housing and one or more lights are configured within the housing, wherein the one or more lights is not exposed on the exterior or outside surface of the housing. The housing comprises a top portion having an exterior top surface, a bottom portion having an exterior bottom surface, and an interior between the top and bottom portions. The top and/or bottom surface may be substantially planar and parallel. The housing has a light emitting edge that is curved, and may be an arc of a circle that extends at least about 60 degrees or more, about 90 degrees or more, about 120 degrees or more, about 180 degrees or more, 270 degrees or more, 360 degrees or any range between and including the degrees listed. In an exemplary embodiment, the light emitting edge extends about 90 degrees and the housing is a quarter circle shape, or a quarter wedge of a circle. The radius of the arc in this embodiment may be the length of one of the two straight sides. In another embodiment, the light emitting edge extends about 180 degrees and the housing is a half-circle shape having a single straight back side. In another embodiment, the light emitting edge extends more than 180 degrees from a single straight back side. The curved or arc shaped light emitting edge and emitting gap configured along this edge enables light to be projected over a large area of the floor. The light emitting gap may be a continuous slot that has a length that is substantially the same as the length of the light emitting edge, or at least 75% of the length of the light emitting edge, and more preferably at least about 85% of the length of the light emitting edge. The length of the light emitting edge, or the radius of the arc, may be about 10 cm or more, about 15 cm or more, about 20 cm or more, about 50 cm or more and any range between and including the values provided. A portable floor light configured to fit in the corner of a room may have a radius that is about 10 to 20 cm, as it may be preferred to keep the portable floor light rather small and unobtrusive. A portable floor light configured to fit under the bed may be larger, having a greater arc extension, such as 180 degrees or more and a radius that is 20 cm or more to enable the portable floor light to project light out from both sides and the end of the bed, for example. A small and discrete opening in the housing would limit the area over which the light would be projected vertically.

The one or more lights are configured within the housing at a recess distance back from the light emitting edge or the light emitting gap, the slot for the projection of the light from the housing. The recess distance enables the light to be projected in a more uniform manner from the light emitting gap and prevents the lights from being seen by a person standing and direct light rays from the lights projecting upward at a steep emitted light angle. The recess distance may be about 5 mm or more, about 10 mm or more, about 20 mm or more, about 40 mm or more and any range between and including the recess distances provided. The recess distance may be at least 25% of the radius of the housing or at least 50% of the radius of the housing. The inside surfaces of the top and bottom portions and the interior surfaces of the straight side, as well as a reflector configured within the housing and behind the light may comprise a reflective surface to allow light to be reflected back and forth before being emitted from the light emitting gap. A reflective surface may be paint or a mirror, for example. The inside-top surface may comprise a light reflective surface from about the position of the light or lights to the light emitting edge. The inside-bottom surface may comprise a reflective surface from about the position of the light or lights to a non-reflective surface that extends from the light emitting edge inward an offset distance. This non-reflective and/or matte surface proximal to the light emitting edge on the inside-bottom surface prevents light from reflecting off of the bottom inside surface and being emitted at a high or steep emitted angle. A non-reflective surface may be paint, such as a black paint and/or may comprises a structure that absorbs light, such as a porous surface, such as a porous or rough foam surface.

An exemplary portable floor light may comprise light channels bordered and defined by one or more separators that extend within the housing between individual lights. A light channel may be configured between a separator and an interior side wall, or between two separators. The separators may have reflective surfaces that enhance the light transmission. In addition, the separators may have a tapered shape from a light end to a light emitting end. An exemplary light separator may extend from the lights, or to a position behind the lights, such as the back wall to the light emitting edge, and from the inside bottom surface of the housing to the inside top surface of the housing and thereby create channels with no light mixing between adjacent light channel. The separator may also improve the physical robustness of the portable light fixture, wherein the separators act as supports along the interior volume to prevent compression of the top or bottom portion of the housing.

A light emitted angle, the angle of light emitted from the portable floor light or light emitting gap as measured from the floor or floor plane, may be shallow such as less than about 25 degrees and preferably less than 15 degrees and even more preferably less than 10 degrees. This shallow light emitted angle prevents light from being incident on a person's eyes directly and provides better floor surface illumination. The housing may have a height that is relatively small, such as about 50 mm or less, about 40 mm or less, about 25 mm or less, about 15 mm or less and any range between and including the height dimensions provided. Again, the height may be preferably small to keep the portable floor light unobtrusive. The light emitting gap may be less than the height of the portable floor light and may be a narrow slot along the light emitting edge having a gap height of about 15 mm or less, about 10 mm or less, about 5 mm or less and any range between and including the gap heights provided. The light emitting gap may extend from the inside-top surface of the housing to the inside-bottom surface of the housing or may be less than this dimension. A top emitting edge portion and/or a bottom emitting edge portion may extend along the light emitting edge to define the light emitting gap.

An exemplary portable floor light comprises one or more lights configured within the interior of the housing. The one or more lights may be light emitting diodes (LED). The one or more lights may emit a certain wavelength of light, such as red, yellow and orange light, having a wavelength of about 570 nm to about 750 nm, and preferably orange and red light having a wavelength of about 590 nm to about 750 nm. The wavelength of light with respect to the visible color is provided in Table 1. As described herein, the lower wavelength lights are more disruptive to circadian rhythms and are not preferred.

TABLE 1

| Color | Wavelength nm | Frequency THz | Photon Energy eV |
|---|---|---|---|
| violet | 380-450 | 668-789 | 2.75-3.26 |
| blue | 450-495 | 606-668 | 2.50-.275 |
| green | 495-570 | 526-606 | 2.17-2.50 |
| yellow | 570-590 | 508-526 | 2,10-2,17 |
| orange | 590-620 | 484-508 | 2.00-2.10 |
| red | 620-750 | 400-484 | 1.65-2.00 |

An exemplary portable floor light may comprise a light filter and light elements that produce a broad spectrum of light, wherein the lower wavelength light is filtered out by the light filter. A thin plastic light filter may be configured over the emitting gap and filter the light to allow only the higher wavelengths of light, such as light with a wavelength of 570 nm or more, or light with a wavelength of about 590 nm or more. A light filter may filter out light with wavelengths of 590 nm or less, or about 570 nm or less, or in some cases about 500 nm or less. An exemplary light fitters for blue light, or lower wavelength visible light, OcuShield™, is available from Ocushield LTD, London, England. A light filter may comprise specific polymers or chemical compounds that filter light of certain wavelengths.

An exemplary portable floor light is portable, wherein it is of a size to allow it to be easily carried by a single person, such as having no dimension greater than about 100 cm and preferably no more than about 75 cm, 50 cm, 40 cm, or 20 cm. In addition, an exemplary portable floor light comprises a battery power supply enabling it to be used in any location. In another embodiment, the portable floor light comprises a power cord for plugging into an electrical outlet to provide electrical power.

An exemplary portable floor light comprises a controller that may include a circuit board and/or a computing device, such as a microprocessor. The controller receives signals from the sensors, such as the light and motion sensors, to determine when to activate the light. The light sensor measures or detects the ambient light level and the lights will be deactivated when the ambient light is above some threshold value, such as during daylight hours, or when a room light is on. The motion detector detects motion proximal to the portable floor light. The light sensor and the motion sensor may be configured on or have a window to the top surface of the housing and the motion sensor may be configured proximal to the front of the housing, such as proximal to the light emitting edge. The light sensor and the motion sensor may be configured on any part of the device however.

The summary of the invention is provided as a general introduction to some of the embodiments of the invention, and is not intended to be limiting. Additional example embodiments including variations and alternative configurations of the invention are provided herein.

BRIEF DESCRIPTION OF THE DRAWINGS

The accompanying drawings are included to provide a further understanding of the invention and are incorporated in and constitute a part of this specification, illustrate embodiments of the invention, and together with the description serve to explain the principles of the invention.

FIG. 7 shows a top perspective view of an exemplary portable floor light having a plurality of light channels with separators there between.

FIG. 8 shows a top perspective view of an exemplary portable floor light having a plurality of light channels with separators there between.

Figure 1:
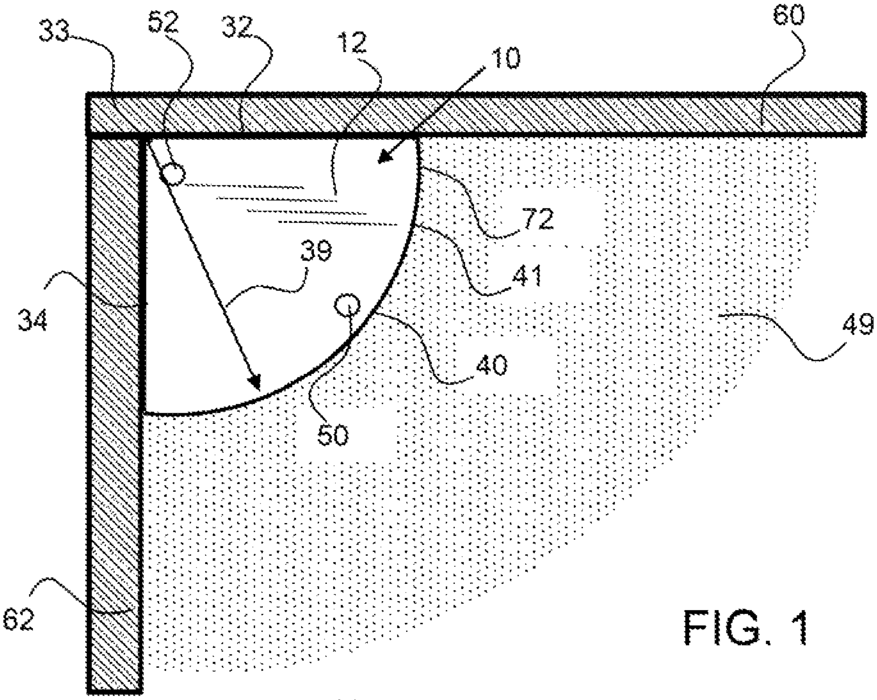
FIG. 1 shows a top view of an exemplary portable floor light configured in the corner between two walls and emitting light from the curved light emitting edge.

Corresponding reference characters indicate corresponding parts throughout the several views of the figures. The figures represent an illustration of some of the embodiments of the present invention and are not to be construed as limiting the scope of the invention in any manner. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

DETAILED DESCRIPTION OF THE ILLUSTRATED EMBODIMENTS

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

Certain exemplary embodiments of the present invention are described herein and are illustrated in the accompanying figures. The embodiments described are only for purposes of illustrating the present invention and should not be interpreted as limiting the scope of the invention. Other embodiments of the invention, and certain modifications, combinations and improvements of the described embodiments, will occur to those skilled in the art and all such alternate embodiments, combinations, modifications, improvements are within the scope of the present invention.

Figure 2:
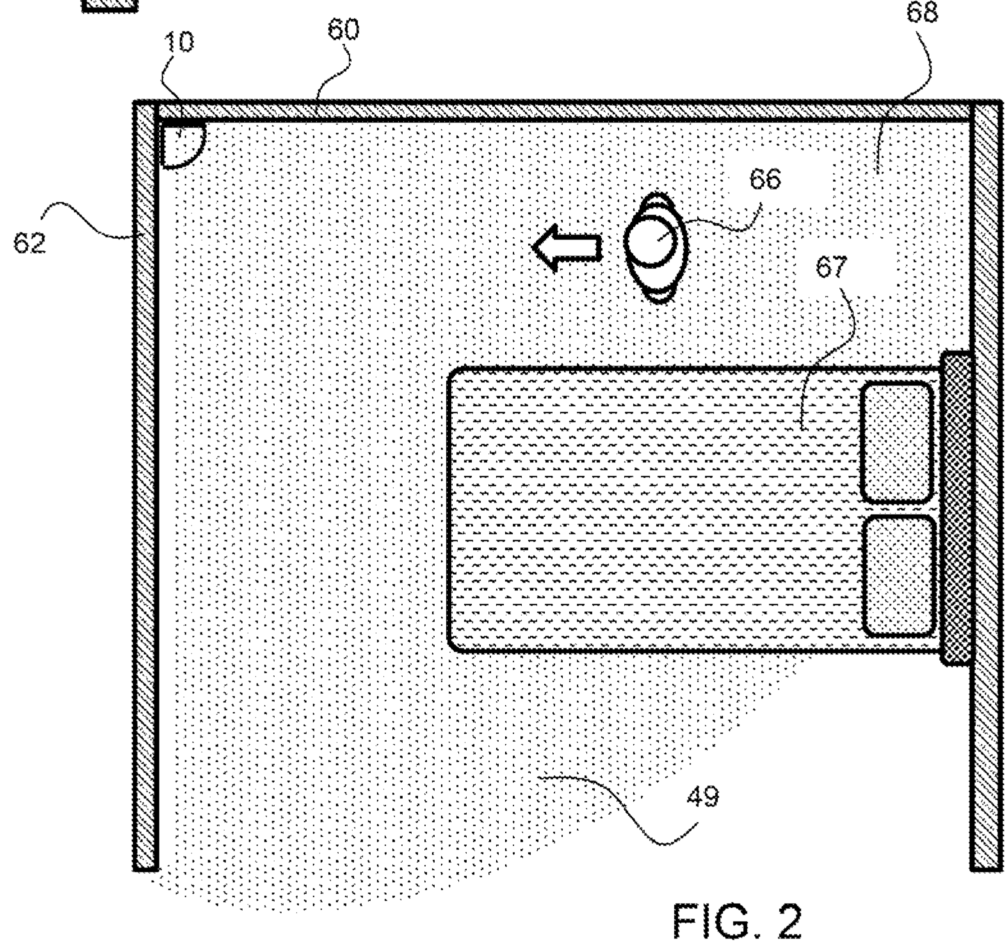
FIG. 2 shows a top view of an exemplary portable floor light configured in the corner of a bedroom and emitting light when the person gets out of bed.

Referring to FIGS. 1 and 2, an exemplary portable floor light 10 comprises a housing that is semicircular in shape, having two straight sides 32, 34 that extend from a corner 33 to a curved side that extends about 90 degrees from the extended ends of the two straight sides. The exemplary portable floor light is configured in the corner between two walls 60, 62 and is emitting light 49 from the curved light emitting edge 40. The portable floor light is configured is the corner of the bedroom 68 where it will be out of the way. When the person 66 gets out of bed 67, the motion detector 50 will sense the person's motion and the light will be activated. The exemplary portable floor light also has a light sensor 52 that is used to prevent the lights from turning on when there is an ambient light level above some threshold. The exemplary portable floor light has a light emitting edge 40 that is an arc that extends about 90 degrees about radius 39 and intersects with a first straight side 32 and a second straight side 34 that extend from the corner 33 in perpendicular directions. The center point for the radius is in the corner 33 of the housing. This geometry of the housing 12, a quarter-circle shape, allows the exemplary portable floor light to fit snuggly in the corner of the room.

Figure 3:
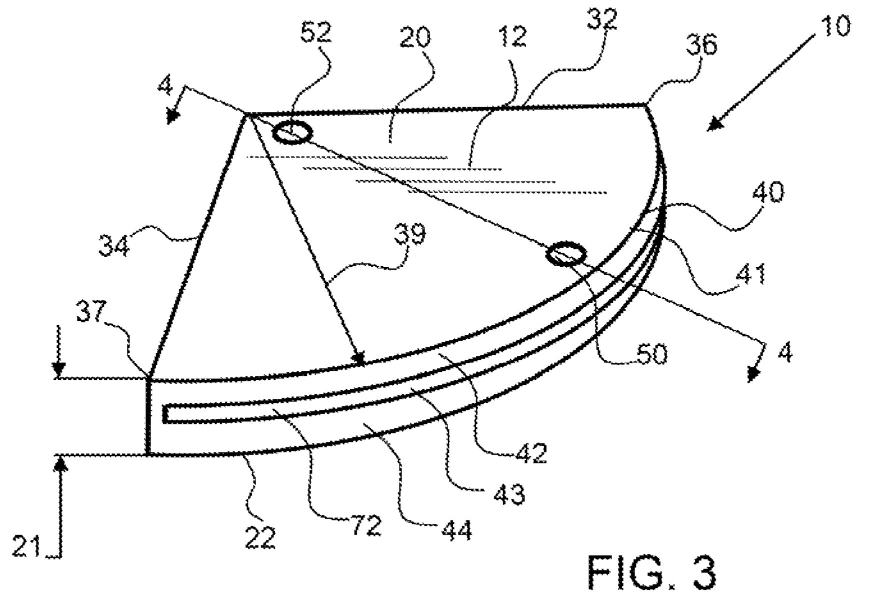
FIG. 3 shows a perspective view of an exemplary portable floor light having a motion and a light sensor.

As shown in FIG. 3, an exemplary portable floor light 10 has a motion sensor 50 and a light sensor 52. The housing is a semicircular shape and has a light emitting edge 40 that is an arc 41 about a radius from the extended ends 36, 37 of the first and second sides, respectively. The light emitting edge has an emitting gap 43 for allowing light to be projected from the interior of the housing 12. The emitting gap is a slot between a top emitting edge portion 42 and a bottom emitting edge portion 44. The top edge portion may be an extension from the top portion 20 and the bottom edge portion may be an extension from the bottom portion 22 of the housing, or they may simply be the extended edge of the top and bottom portion, respectively. A light filter 72 is configured over the light emitting gap 43 and filters out the lower wavelength light, such as blue visible light. The housing 12 has a thickness 21 from the top surface of the top portion 20 to the bottom surface of the bottom portion 22. The housing may be relatively thin, as described herein, to enable the portable floor light to be unobtrusive. The top surface of the top portion may be planar as shown.

Figure 4:
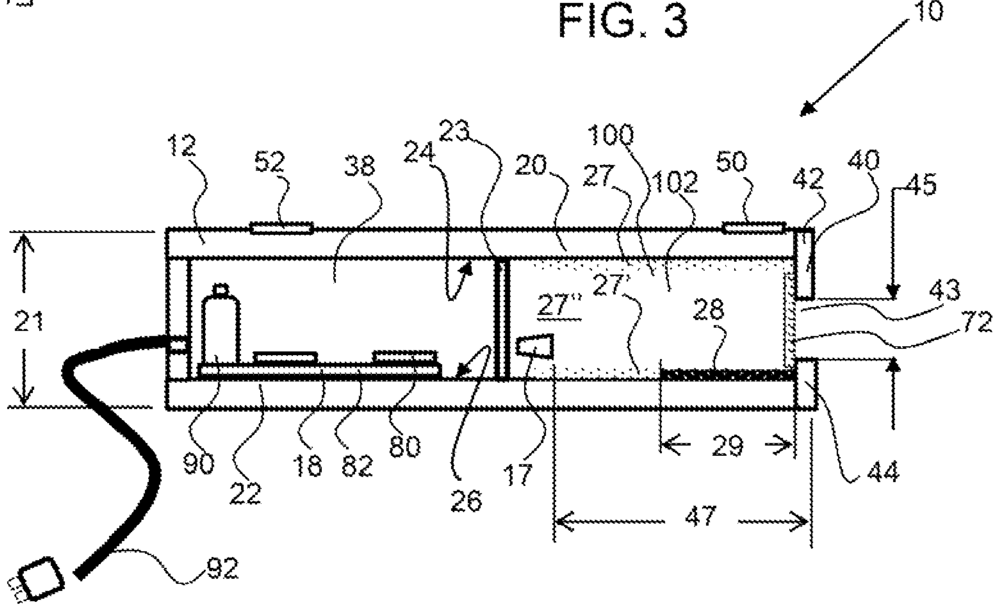
FIG. 4 shows a cross-sectional view along line 4-4 of FIG. 3, of an exemplary portable floor light having a light configured in the interior of the housing.
Figure 5:
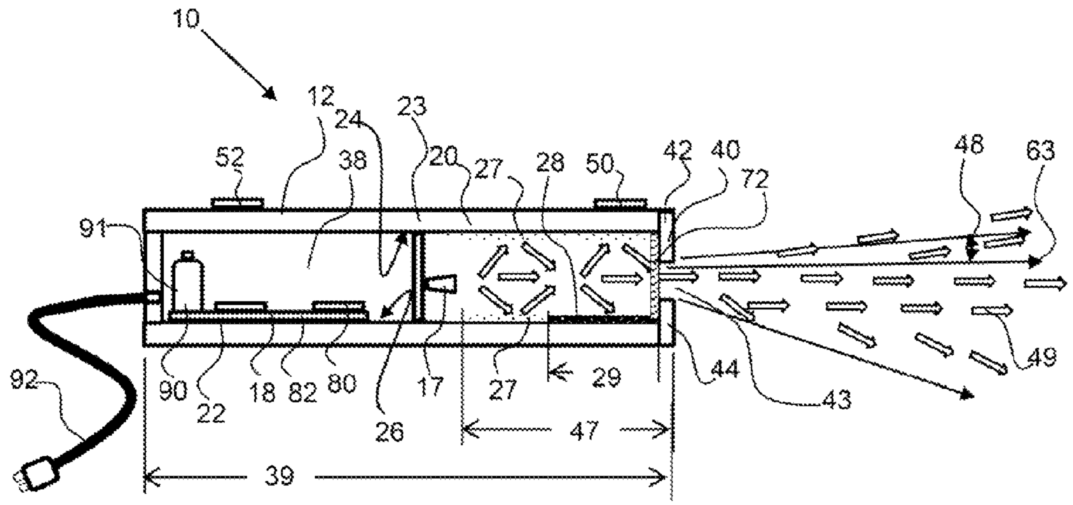
FIG. 5 shows a cross-sectional view along line 4-4 of FIG. 3, of an exemplary portable floor light having a light that is emitting an emitted light through the emitting gap of the light emitting edge.

Referring to FIGS. 4 and 5, an exemplary portable floor light 10 has a light configured in the interior 38 of the housing 12. Inside of the interior of the housing is the controller 18 comprising a circuit board 82 and a microprocessor 80. A battery power supply 90 comprising a battery 91 is configured within the housing 12, and a power cord extends from the housing to allow the portable floor light to be plugged into an electrical outlet. The motion sensor 50 and light sensor 52 are coupled with the controller 18 to provide input signals regarding motion proximal to the portable floor light and ambient light levels, respectively. A light 17 is configured within the housing 12 and projects light toward the light emitting gap 43 in the light emitting edge 40. The light emitting gap length 45 is shown and may be relatively small, as described herein. The light is configured at a recess distance 47 from the light emitting edge 40, as shown, and this distance may be at least 25% of the radius or at least 50% of the radius of the housing. The inside-top surface 24 has a reflective surface 27 for the reflection of the light from the light source within the interior 38 of the housing. The inside-bottom surface 26 has a reflective surface 27' for the reflection of the light from the light source within the interior of the housing. In addition, the interior surface of the straight side has a reflective surface 27", a reflector 23 having a reflective surface facing the plurality of lights reflects light toward the light emitting gap. A non-reflective surface 28 may extend on the inside-bottom surface from the light emitting edge an offset distance 29. This non-reflective surface may be configured to reduce light being reflected upward out of the light emitting gap 43. A light filter 72, a thin plastic sheet of material, is configured over the light emitting gap and on the interior of the housing, as shown in FIG. 4. The light filter may be configured over the exterior portion of the light emitting gap as well. As shown in FIG. 5, the light emitted angle 48, the angle of light projection from the light emitting gap, as measure from the floor plan 63, is shallow, as described herein, to prevent light from being directed into a person's eyes.

Figure 6:
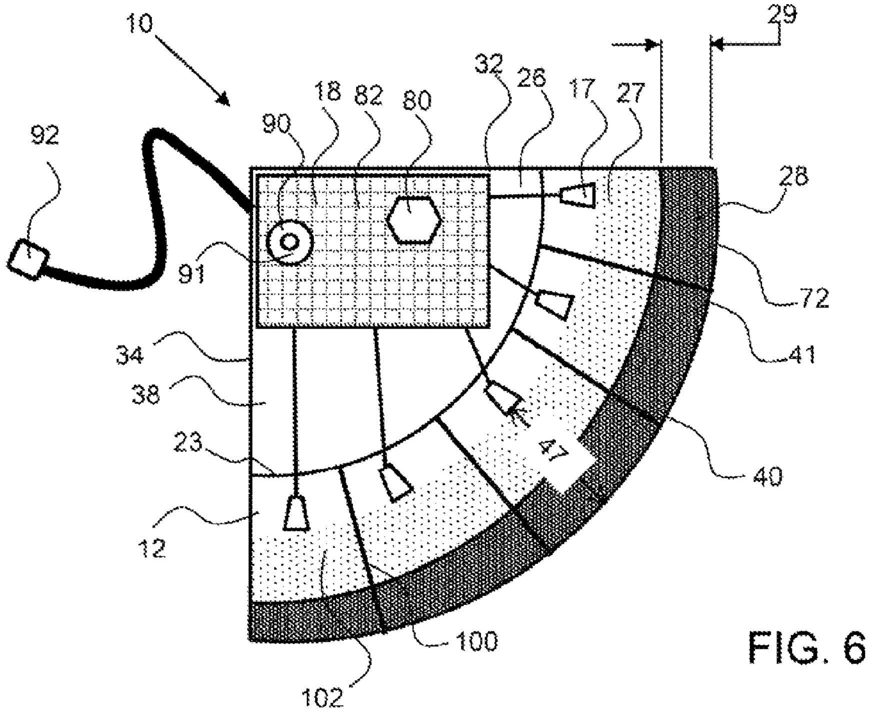
FIG. 6 shows a top view of an exemplary portable floor light having a controller comprising a microprocessor and circuit board.

As shown in FIG. 6, an exemplary portable floor light 10 has five lights 17 configured along an arc that is recessed in a recess distance 47 from the light emitting edge 40 and within the interior 38 of the housing 12. The top portion is removed in this figure to show the interior of the housing. A controller 18 comprises a microprocessor 80 and circuit board 82. The lights receive power from the power supply 91 which may be batteries 90 or electrical power from an electrical outlet delivered through the power cord 92. The reflective surface 27 and the non-reflective surface 28 of the inside-bottom surface 26 is shown. A reflector 23 having a reflective surface facing the plurality of lights reflects light toward the light emitting gap. The reflector is curved extending along an arc that extends about the same arc distance as the light emitting edge. The reflector extends within the housing and extends substantially from the inside bottom surface 26 to the inside top surface 24, wherein it extends at least 50% of the distance between the inside bottom surface to the inside top surface. The reflector may be coupled to the inside bottom surface or the inside top surface. Also shown in FIG. 6 are a plurality of separators 100 that forms light channels 102, as better shown in FIGS. 7 and 8.

Figure 7:
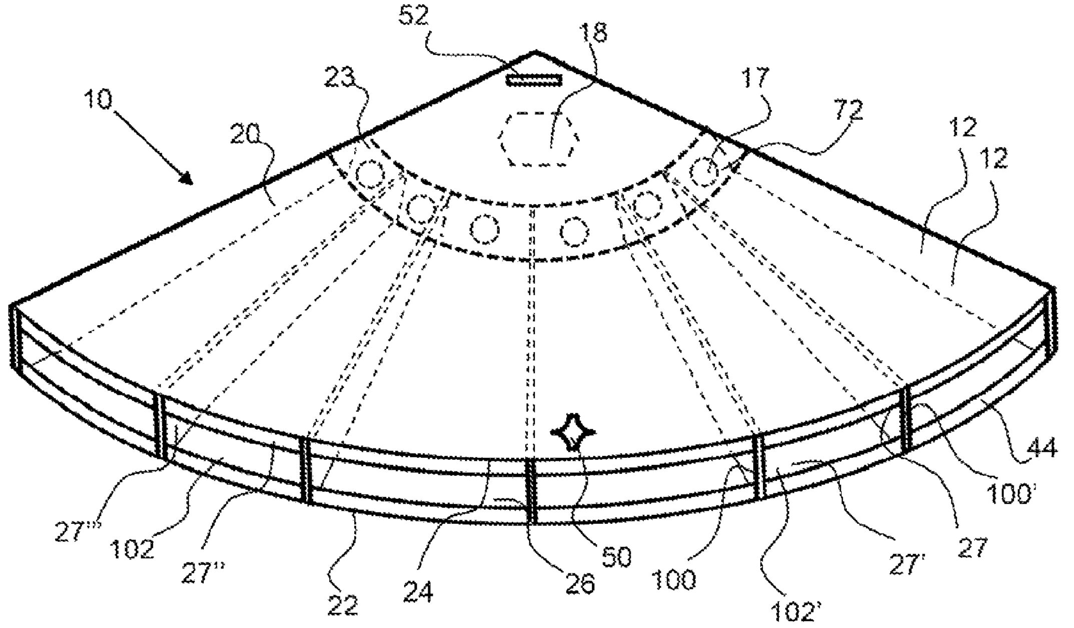
Figure 8:
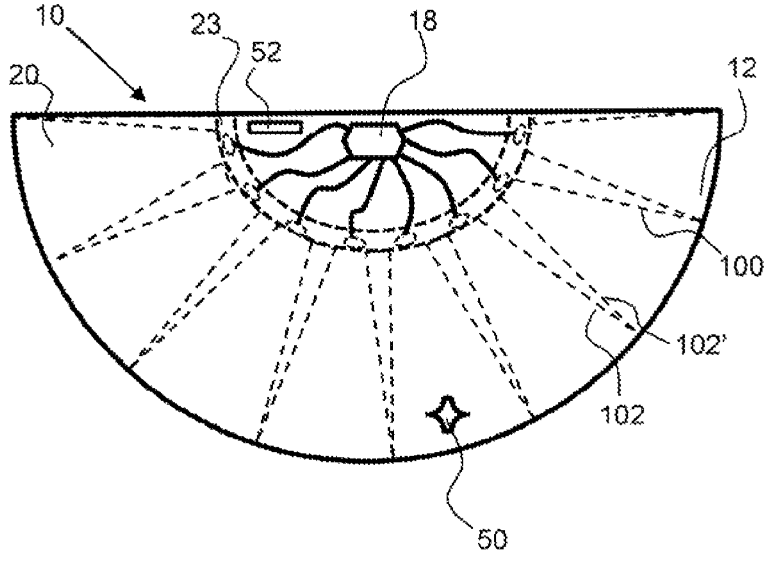

Referring to FIGS. 7 and 8, an exemplary portable floor light 10 has a plurality of light channels 102 with separators 100 there between. The separators extend within the open space within the housing 12 and have reflective surfaces 27. The separator may have reflective surfaces on both sides, thereby providing a reflective surface to two adjacent light channels. The separators may extend from a location proximal to the lights 17, a light end, to a location proximal to the light emitting edge 40, and edge end. The separators may extend from the lights 17 to the emitting edge, thereby completely separating the light emitted from each of the plurality of lights within the housing. The separators, the inside top surface 24 and the inside bottom surface 26 may all comprise reflective surfaces and thereby increase the efficiency of light projected from the portable light source. The separators may be planar, such as a film or sheet of material. As shown in FIG. 8, the separators have a tapered shaped from the light end to the light emitting edge end. The tapered shape may increase the intensity of light emitted from the light emitting edge 44.

Figure 9:
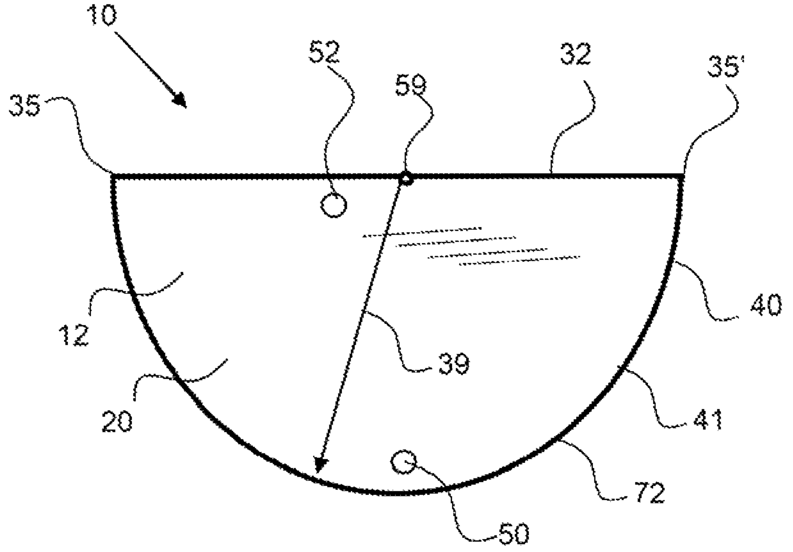
FIG. 9 shows a top view of an exemplary portable floor light having light emitting edge that extends 180 degrees.

As shown in FIG. 9, an exemplary portable floor light 10 has a light emitting edge 40 that extends an arc 41 of about 180 degrees and about radius 39 that extends from a center point 59 that is located at a midpoint along the length of the straight side 32, or backside. The housing 12 is a half-circle shape. The light emitting edge 40 intersects with the straight side 32 at intersections 35 and 35'. The length of the straight side is about the diameter, or twice the radius 39, of the light emitting edge. The arc 41 of the light emitting edge 40 extends a radius 39 from a center point 59, configured proximal to, or along the straight side 32.

Figure 10:
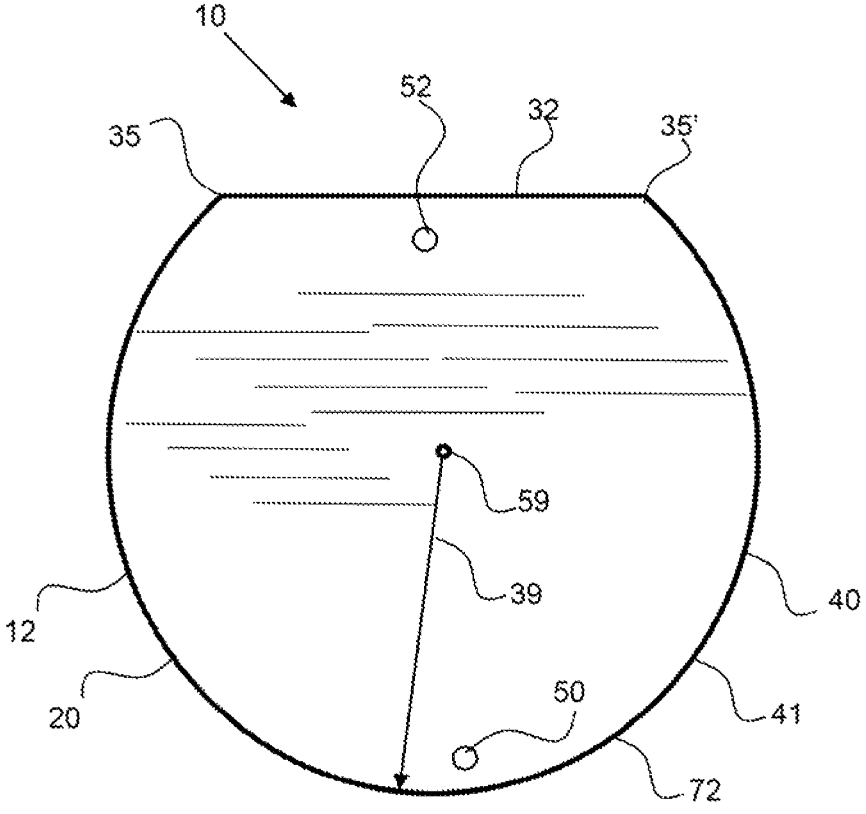
FIG. 10 shows a top view of an exemplary portable floor light having light emitting edge that extends more than 180 degrees.

As shown in FIG. 10, an exemplary portable floor light 10 has a light emitting edge 40 that extends an arc or radius that spans more than 180 degrees. The housing 12 is a semi-circular in shape. The light emitting edge 40 intersects with the straight side 32 at an intersection 35 and 35'. The length of the straight side is less than the diameter, or twice the radius 39, of the light emitting edge. The arc of the light emitting edge 40 extends a radius 39 from a center point 59.

Figure 11:
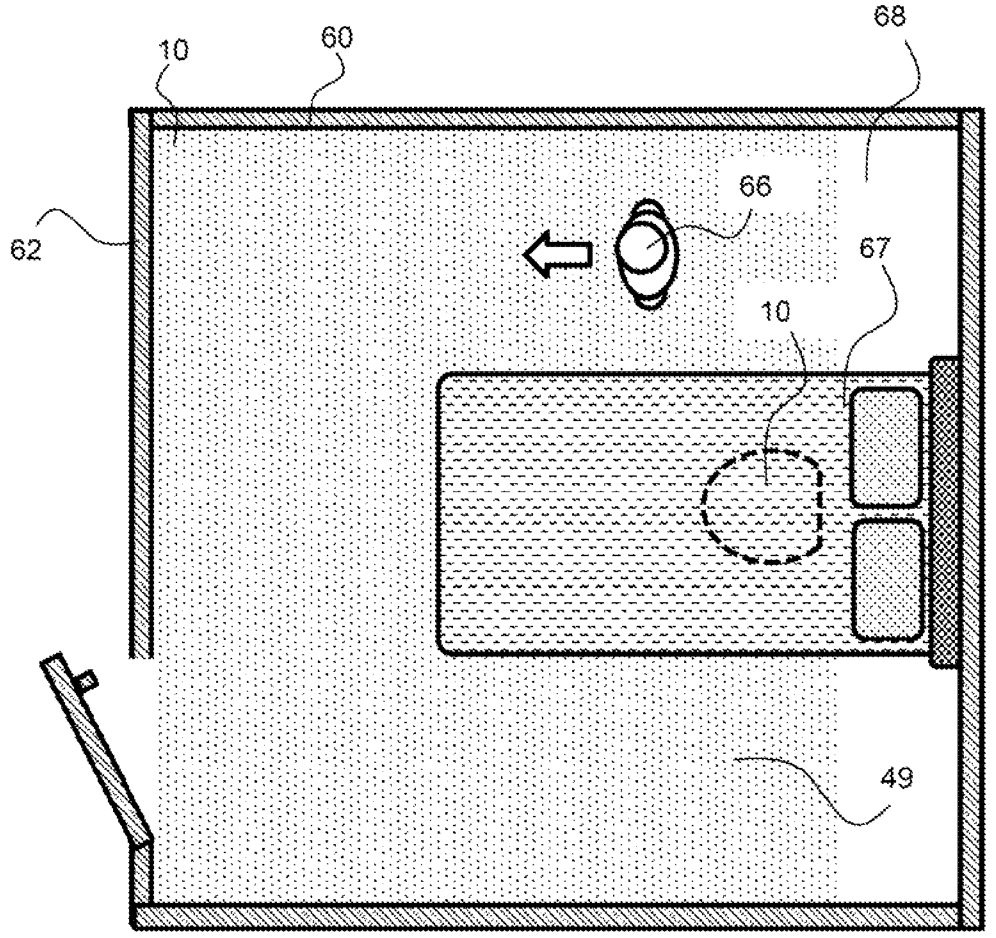
FIG. 11 shows a top view of an exemplary portable floor light configured under a bed in a bedroom and emitting an emitted light when the person gets out of bed.

As shown in FIG. 11, an exemplary portable floor light 10 is configured under a bed 67 in a bedroom 68 and is emitting an emitted light 49 when the person gets out of bed. The portable floor light 10 has a light emitting edge that extends an arc of about 270 degrees. The portable floor light is completely out of the way when placed under the bed and can detect the motion when someone gets out of the bed or returns to the bed to provide light in the dark.

Figure 12:
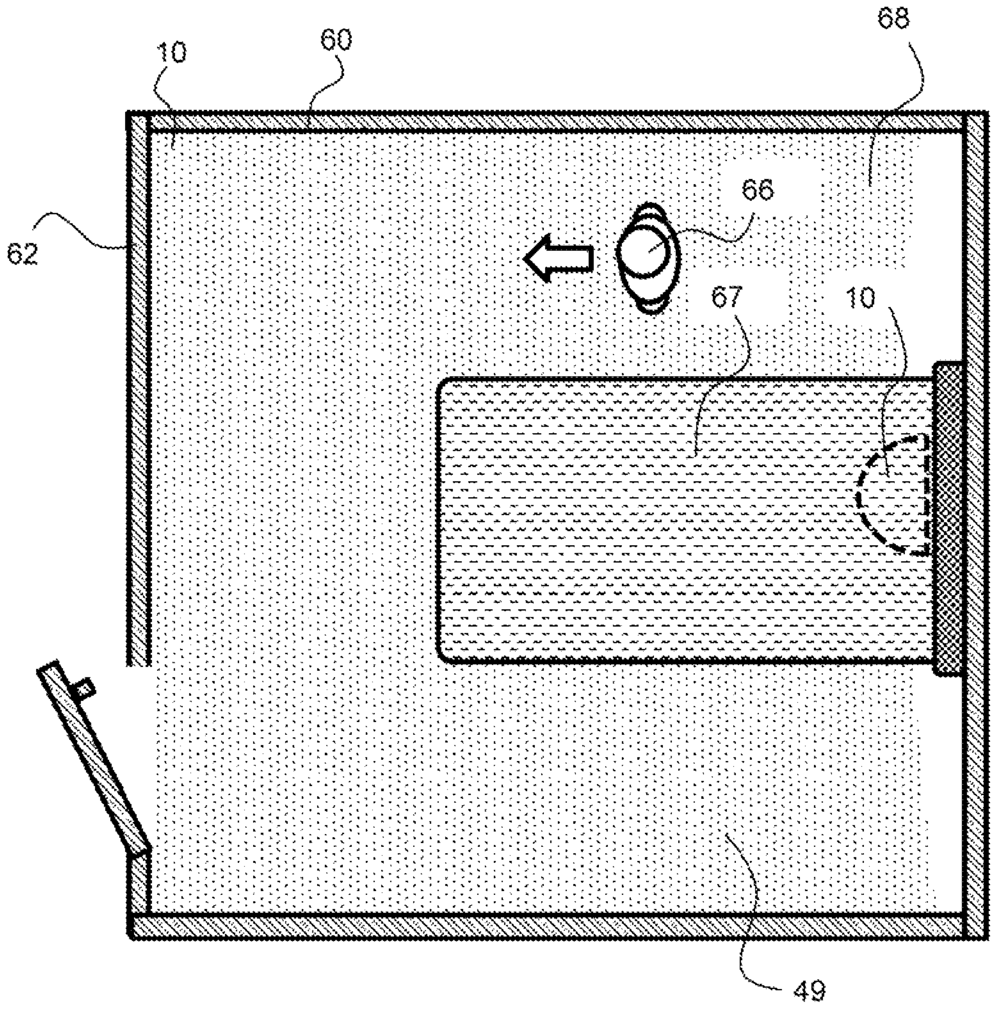
FIG. 12 shows a top view of an exemplary portable floor light configured under a bed in a bedroom and emitting an emitted light when the person gets out of bed.

As shown in FIG. 12, an exemplary portable floor light 10 is configured under a bed 67 in a bedroom 68 and is emitting an emitted light 49 when the person gets out of bed. The portable floor light 10 has a light emitting edge that extends an arc of about 180 degrees and is a half-circle shape. The portable floor light is completely out of the way when placed under the bed and can detect the motion when someone gets out of the bed or returns to the bed to provide light in the dark.

It will be apparent to those skilled in the art that various modifications, combinations and variations can be made in the present invention without departing from the spirit or scope of the invention. Specific embodiments, features and elements described herein may be modified, and/or combined in any suitable manner. Thus, it is intended that the present invention cover the modifications, combinations and variations of this invention provided they come within the scope of the appended claims and their equivalents.

What is claimed is:

1. A portable floor light comprising:

a) a housing comprising
  i) a top portion;
  ii) a bottom portion;
  iii) an interior between the top and bottom portions;
  iv) a light emitting edge having a light emitting gap in said light emitting edge;
  v) an inside-top surface;
  vi) an inside-bottom surface;
  wherein the light emitting edge is curved;

b) a light configured within the interior and recessed in from the light emitting edge by a recess distance;
  wherein the light emits an emitted light;
  wherein the emitted light is projected from the housing as projected light at an emitted angle of no more than about 15 degrees;

c) a power supply for said light;

d) a controller;

e) a light sensor coupled with the controller to measure an ambient light level; and f) a motion detector coupled with the controller;
  wherein the controller turns on the light when the motion detector detects motion and when the light sensor does not detect ambient light above a threshold level, and wherein an emitted light from the light is projected out from the light emitting edge and across a floor.

2. The portable floor light of claim 1, wherein the emitted light has a wavelength no less than 570 nm.

3. The portable floor light of claim 1, comprising a light filter that filters out the emitted light to produce a projected light having a wavelength no less than 570 nm.

4. The portable floor light of claim 3, wherein the light filter is a plastic sheet that extends over the light emitting gap.

5. The portable floor light of claim 1, wherein the light emitting edge extends in an arc that is at least 60 degrees.

6. The portable floor light of claim 5, wherein the arc extends at least 90 degrees.

7. The portable floor light of claim 5, wherein the arc extends at least 180 degrees.

8. The portable floor light of claim 5, wherein the arc extends at least 270 degrees.

9. The portable floor light of claim 1, wherein the recess distance is 20 mm or more.

10. The portable floor light of claim 1, wherein a portion of the inside-top surface is light reflective.

11. The portable floor light of claim 1, wherein a portion of the inside-bottom surface comprises a non-light reflective surface that extends an offset distance from the light emitting edge into the housing.

12. The portable floor light of claim 11, wherein the offset distance is at least 10 mm.

13. The portable floor light of claim 1, further comprising a reflector configured within the housing and behind the light to reflect light toward the light emitting edge.

14. The portable floor light of claim 1, comprising a plurality of lights and further comprising at least one separator within the interior of the housing that forms a plurality of light channels for the projection of light emitted light along said light channels.

15. The portable floor light of claim 1, wherein the light channels comprise reflective surfaces.

16. The portable floor light of claim 1, wherein the housing has a semi-circular shape.

17. The portable floor light of claim 16, wherein the housing has a quarter-circle shape comprising a first side and a second side that extend from a corner substantially perpendicularly to each other, and wherein the light emitting edge extends an arc that is substantially 90 degrees and about a radius having a center point proximal the said corner.

18. The portable floor light of claim 16, wherein the housing has a half-circle shape comprising a single substantially straight back side that extends to a light emitting edge that is an arc that is substantially 180 degrees and has a radius having a center point proximal a midpoint along said straight back side.

19. The portable floor light of claim 1, further comprising batteries configured with the housing to power the plurality of lights.

20. The portable floor light of claim 1, comprising at least three lights.

21. A portable floor light comprising:
a) a housing comprising
i) a top portion;
ii) a bottom portion;
iii) an interior between the top and bottom portions;
iv) a first side;
v) a second side;
vi) a light emitting edge having a light emitting gap;
vii) an inside-top surface;
viii) an inside-bottom surface;
wherein the housing has a quarter-circle shape wherein the first side and the second side extend from a corner substantially perpendicularly to each other, and wherein the light emitting edge extends an arc that is substantially 90 degrees and about a radius having a center point proximal the said corner;
b) a light configured within the interior and recessed in from the light emitting edge by a recess distance that emits an emitted light;
wherein said emitted light is projected from the light emitting edge as projected light having an emitted angle of no more than about 15 degrees;
wherein the recess distance is 10 mm or more;
wherein the emitted light has a wavelength no less than 570 nm;
c) a battery power supply for said plurality of lights that is configured in said housing;
d) a controller;
e) a light sensor coupled with the controller to measure an ambient light level; and
f) a motion detector coupled with the controller;
wherein the controller turns on the plurality of lights when the motion
detector detects motion and when the light sensor does not detect ambient light above a threshold level, and wherein an emitted light from the plurality of lights is projected out from the light emitting edge and across a floor.

22. A portable floor light comprising:
a) a housing comprising
i) a top portion;
ii) a bottom portion;
iii) an interior between the top and bottom portions;
iv) a straight back side
v) a light emitting edge;
vi) an inside-top surface;
vii) an inside-bottom surface;
wherein the housing has a semi-circle shape wherein the straight back side extends to the light emitting edge that is an arc that is 180 degrees or more
a plurality of lights configured within the interior of the housing and recessed in from the light emitting edge by a recess distance;
wherein the recess distance is 20 mm or more;
wherein an emitted light from the light emitting edge has an emitting angle that is no more than about 15 degrees;
b) a light configured within the interior and recessed in from the light emitting edge by a recess distance that emits an emitted light;
wherein said emitted light is projected from the light emitting edge as projected light having a light emitted angle of no more than about 15 degrees;
wherein the recess distance is 20 mm or more;
wherein the emitted light has a wavelength no less than 570 nm;
c) a battery power supply for said plurality of lights that is configured in said housing;
d) a controller;
e) a light sensor coupled with the controller to measure an ambient light level; and
f) a motion detector coupled with the controller;
wherein the controller turns on the plurality of lights when the motion
detector detects motion and when the light sensor does not detect ambient light above a threshold level, and wherein an emitted light from the plurality of lights is projected out from the light emitting edge and across a floor.

23. The portable floor light of claim 22, wherein the housing has a half-circle shape, wherein the straight back side extends to the light emitting edge that is an arc extending substantially 180 degrees and having a radius with a center point proximal a midpoint along said straight back side.

* * * * *